Figure 1:
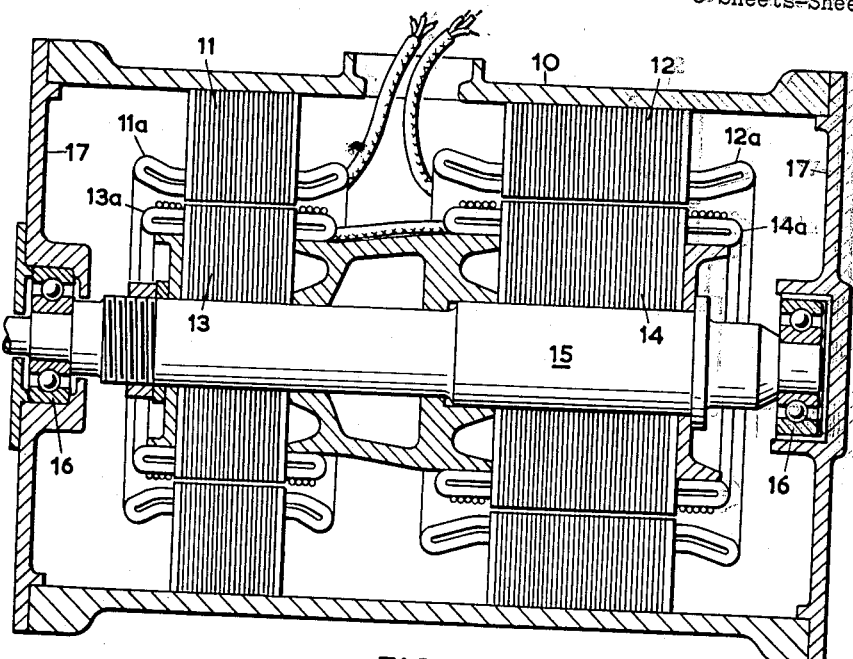

May 11, 1965　　　A. W. FORD　　　3,183,431
CONSTANT FREQUENCY BRUSHLESS GENERATING SYSTEM
Filed Jan. 23, 1961

3 Sheets-Sheet 1

INVENTOR:
ARTHUR WILLIAM FORD
By: Stevens, Davis, Miller + Mosher
Attorneys

May 11, 1965   A. W. FORD   3,183,431
CONSTANT FREQUENCY BRUSHLESS GENERATING SYSTEM
Filed Jan. 23, 1961
3 Sheets-Sheet 3

INVENTOR:
ARTHUR WILLIAM FORD
By: Stevens, Davis, Miller & Mosher
Attorneys

United States Patent Office

3,183,431
Patented May 11, 1965

3,183,431
CONSTANT FREQUENCY BRUSHLESS
GENERATING SYSTEM
Arthur William Ford, London, England, assignor to Sundstrand Corporation, a corporation of Illinois
Filed Jan. 23, 1961, Ser. No. 84,365
13 Claims. (Cl. 322—32)

This invention relates to electric generating apparatus and to a generating system including such apparatus.

According to one aspect of the invention, electric generating apparatus includes, in combination, a stationary magnetic system incorporating at least two polyphase distributed stator windings between which there is substantially no mutual inductance, and a rotor system incorporating a corresponding number of polyphase distributed rotor windings between which there is substantially no mutual inductance, each of the rotor windings being coupled magnetically to the associated stator winding and the rotor windings being connected together electrically in a closed circuit.

According to another aspect of the invention, a generating system for supplying a load with A.C. from a variable speed drive, includes, in combination, electric generating apparatus as set forth above having two stator windings and two rotor windings, one of the stator windings, hereinafter referred to as the output winding, being utilized as the output winding and the other stator winding, hereinafter referred to as the control winding, being connected to a variable frequency source capable of supplying power to, or receiving power from, said control winding, and frequency responsive means responsive to the output frequency of the apparatus arranged to vary the frequency of the variable frequency source automatically in a sense to maintain the output frequency in accordance with a predetermined law.

According to yet another aspect of the invention a generating system for supplying a load with A.C. from a variable speed drive includes, in combination, electric generating apparatus as set forth above having three stator windings and three rotor windings, frequency conversion means interconnecting two of the stator windings and arranged to be capable of transferring electrical power between the two windings, the third stator winding being utilized as the output winding, and frequency responsive means responsive to the output frequency of said third stator winding arranged automatically to vary the frequency of the electrical power delivered by the frequency conversion means in a sense to maintain the output frequency of said third stator winding in accordance with a predetermined law.

Further preferred features of the invention will appear from the following description with reference to FIGS. 1–9 of the accompanying drawings.

Figure 2:
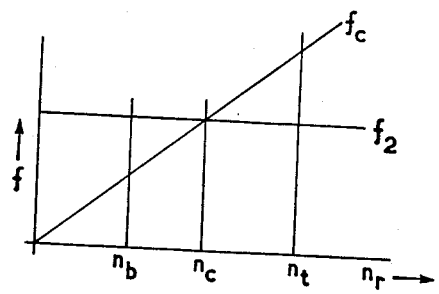
Figure 3:
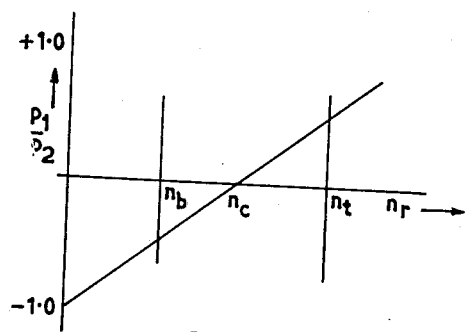
Figure 6:
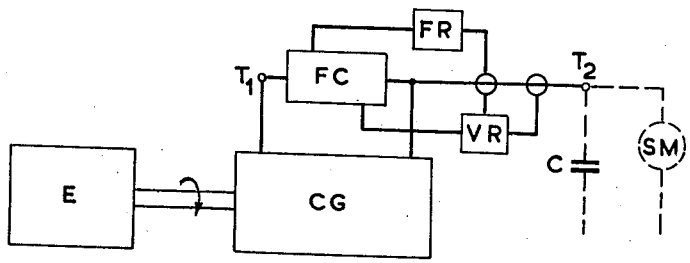
Figure 7:
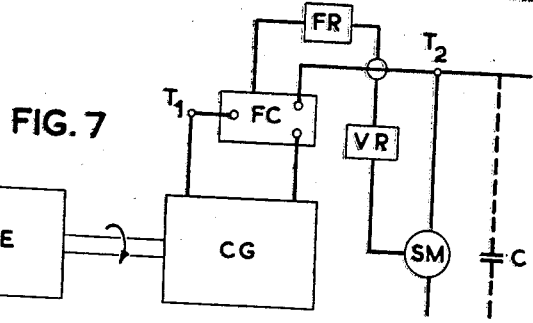
Figure 8:
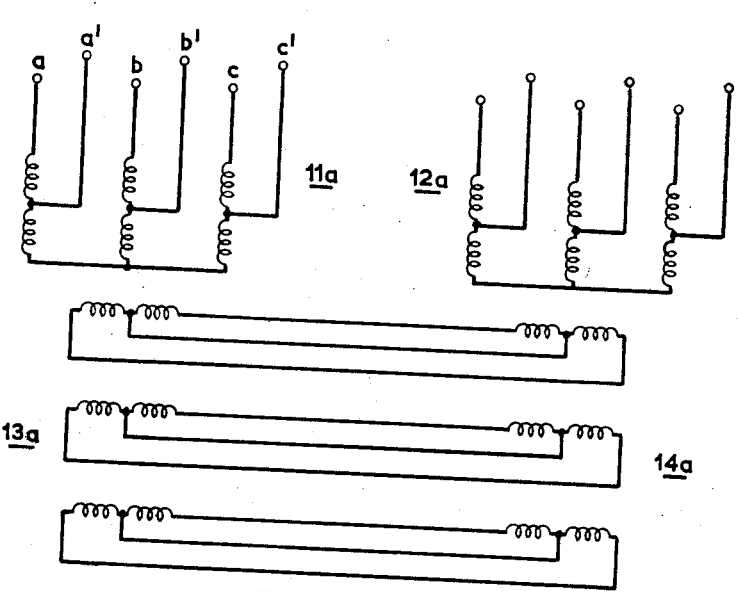
Figure 9:
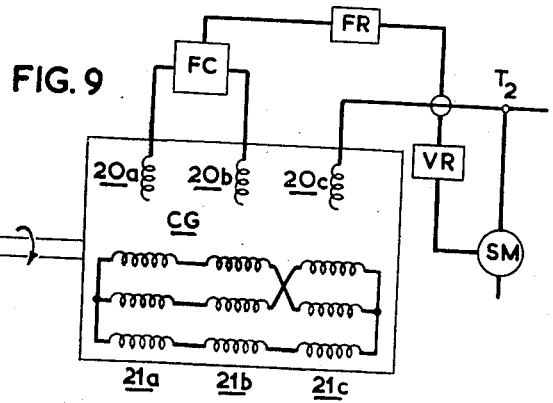

FIG. 1 is a sectional elevation through one form of generating apparatus according to the invention incorporated in a single machine, FIGS. 2 and 3 are graphs illustrating the operation of the machine whilst FIGS. 4 to 7 show four different circuits using the machine of FIG. 1 as a generator delivering power at substantially constant frequency from a variable speed drive. FIG. 8 shows the stator and rotor connections for a machine similar to that shown in FIG. 1 but incorporating pole-changing facilities, whilst FIG. 9 shows the circuit diagram of an arrangement including a machine having three separate stator windings and three separate rotor windings.

Referring now to FIG. 1 the machine includes a stator frame 10 in which are mounted two separate laminated stator cores 11 and 12 carrying three-phase A.C. distributed windings 11a and 12a respectively. Corresponding laminated rotor cores 13, 14 having three-phase distributed windings 13a and 14a respectively are mounted on a common shaft 15 which is journalled in bearings 16 carried by the stator end plates 17. Windings 11a and 13a are wound for $p_1$ pole pairs whilst windings 12a and 14a are wound for $p_2$ pole pairs. The windings 13a and 14a are connected together electrically in a closed circuit.

The two rotor windings 13a, 14a may be connected together in one of two ways, namely, either, (a) Positively if the magnetic fields created by the rotor currents revolve in opposite directions with respect to the rotor shaft, and (b) Negatively if the magnetic fields created by the rotor currents revolve in the same direction with respect to the rotor shaft.

When three-phase alternating currents having a frequency $f_1$ cycles per second flow in stator winding 11a a magnetic field is created, which revolves at a speed of $f_1/p_1$ revolutions per second. If now the rotor is driven by an external agency at a speed of $n_r$ revolutions per second, then the frequency of the currents in the rotor winding 13a is $f_{r1} = f_1 - n_r p_1$ cycles per second.

Similarly, the frequency of the currents in the rotor winding 14a is $f_{r2} = f_2 - n_r p_2$.

The relationship between these two rotor frequencies is $$-f_{r2} = \pm f_{r1}$$

Whence $$(f_1 \pm f_2) = n_r(p_1 \pm p_2) \quad (1)$$

It may also be shown that the per-unit slips of the rotor windings are related by the equation $$-\frac{s_1}{s_2} = \pm \frac{f_2}{f_1} \quad (2)$$

Where the ± sign indicates the alternatives appropriate to the connections between the rotor windings, in accordance with the sign convention defined above. Simple relationships between the voltage and power at the terminals of the two stator windings 11a, 12a can be deduced by the application of well-known electrical circuit theory, assuming the windings to have ideal properties, namely negligible resistance and leakage reactance, and that there are no losses due to eddy currents in any of the machine parts. On these assumptions, $$\frac{V_1}{V_2} = \frac{P_1}{P_2} = \pm \frac{f_1}{f_2} \quad (3)$$

where $V_1$=voltage at the terminals of stator winding 11a
$V_2$=voltage at the terminals of stator winding 12a
$P_1$=power delivered from stator winding 11a
$P_2$=power delivered from stator winding 12a By combining Equations 1 and 2 we obtain, $$\frac{V_1}{V_2} = \frac{P_1}{P_2} = \pm \left[ \pm \frac{(f_c - f_2)}{f_2} \right] = \frac{f_c - f_2}{f_2} = \frac{f_c}{f_2} - 1 \quad (4)$$

where $f_c = n_r(p_2 \pm p_1)$ and will be referred to in this specification as the cascade frequency.

The fundamental properties of the ideal machine when used as a frequency converter are defined by Equations 2 and 3. These equations are illustrated graphically in FIGS. 2 and 3 for the case of a machine with positively-connected rotor windings arranged to deliver a constant frequency output when driven at any speed between a lower limit $n_b$ and an upper limit $n_t$. The cascade frequency $f_c$, being directly proportional to the rotor shaft speed $n_r$, is represented by a straight line in FIG. 2. At a certain shaft speed, $n_c$, which may be defined as the cross-over speed, the cascade frequency will be equal to the desired constant output frequency $f_2$. In FIG. 2 the cross-over speed lies somewhere between the limits $n_b$ and $n_t$, although it will be evident that it could lie outside these limits, or coincide with one or other of them. FIG. 3 shows the variation of $P_1/P_2$ with shaft speed $n_r$, as defined by Equation 3. At speeds below the cascade frequency, $f_1/f_2$ and $P_1/P_2$ are both negative and the output frequency has therefore to be made up to the required value $f_2$ by injecting power into stator winding $11a$ at the make-up frequency $f_1$. At speeds above the cascade frequency, $f_1/f_2$ and $P_1/P_2$ are both positive and power has to be extracted from the stator winding $11a$ to maintain the output frequency at the required value $f_2$.

When the machine is used as described above, one of the stator windings, designated as stator winding $12a$ for convenience, will deliver power at a substantially constant frequency $f_2$ irrespective of the cascade frequency $f_c$ (which is directly proportional to the shaft speed), provided that the frequency and power at the terminals of stator winding $11a$ are adjusted to satisfy Equations 3 and 4 above.

Likewise the output voltage $V_2$ of the stator winding $12a$ may be maintained at a substantially constant value by appropriate adjustment of the input voltage $V_1$ of the stator winding $11a$.

Figure 4:
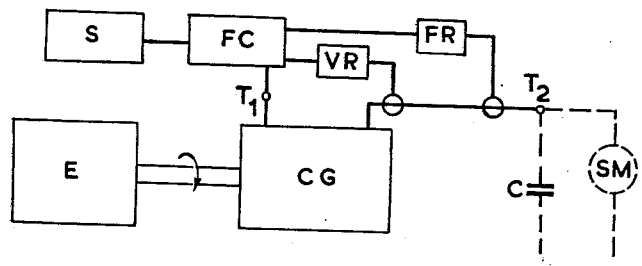

Referring now to FIG. 4, the machine CG as shown in FIG. 1 is driven by an aircraft engine E and has the stator winding $12a$ connected to the output terminals $T_2$ whilst the stator winding $11a$ is connected to the terminals $T_1$ and takes power from, or supplies power to, an external source or sink S via a frequency changer FC of any known kind which may incorporate, for example, transistors, controlled rectifiers or like devices.

In operation the output voltage of the stator winding $12a$ is maintained substantially constant by regulating the make-up voltage generated by the frequency-changer, by means of a regulator VR responsive to the output voltage of the stator winding $12a$. Alternatively the regulation may be applied to the source or sink S.

The output frequency of the stator winding $12a$ is maintained substantially constant by regulating the make-up frequency generated by the frequency-changer FC by means of a regulator FR responsive to the output frequency of the stator winding.

The two regulators function by comparing the output voltage and frequency with that of a reference voltage and frequency respectively and may be of any known kind.

The frequency-changer FC may be mounted or installed in a position remote from the machine since it is only necessary for these units to be connected together by electric cables.

Figure 5:
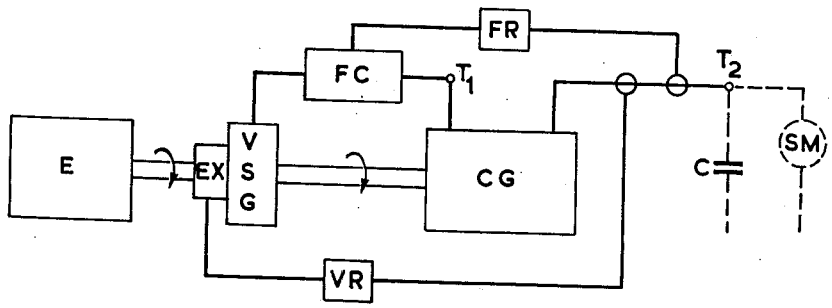

The magnetising volt-amperes required by the machine may be supplied through the frequency-changer FC from the power source S; alternatively, they may be supplied, wholly or in part, through the output terminals $T_2$ from a suitable source such as a capacitor C or a synchronous machine SM, or both, as shown dotted in FIGS. 4, 5 and 6.

The arrangement shown in FIG. 5 is similar to that shown in FIG. 4 except that the function of the power source S of FIG. 4 is fulfilled by a variable speed generator VSG driven by the aircraft engine. If the machine is required to deliver a constant-frequency output over a speed range whose limits lie above and below the cross-over speed, as illustrated in FIG. 2, the variable-speed generator VSG must function as a motor at shaft speeds above the cross-over speed, so as to absorb power from the frequency-changer FC.

In FIG. 5 the voltage regulator VR is connected to an exciter EX to indicate that the voltage of the variable-speed generator VSG is controlled through control of the field of the exciter EX, although such control could also be exercised through the field of the generator itself and this may be preferable in some cases. Alternatively, the control of voltage applied to the terminals $T_1$ of the machine may be effected by regulation of the signals applied to the frequency-changer FC, as in FIG. 4.

FIG. 6 shows an arrangement in which the stator winding $12a$ of the machine performs the function of the power source or sink S shown in FIG. 4.

In this arrangement the constant-frequency side of the frequency-changer FC is connected in parallel with stator winding $12a$ and energised at constant voltage, whereas the variable-frequency side of the frequency-changer FC is required to operate at a variable voltage defined by Equations 3 and 4. Wide variations of this voltage, with corresponding variations of frequency may create difficulties in the operation of the frequency-changer, in which case it may be preferable to use the alternative arrangement shown in FIG. 7. In FIG. 7 the constant-frequency side of the frequency-changer is connected in series with the stator winding $12a$; it may be connected directly in series, or indirectly through a current transformer.

With the series connection as shown in FIG. 7, it is possible, but not necessary, to exercise control over the output voltage through the frequency-changer, but it will generally be simpler and preferable to regulate the field of the synchronous machine SM.

FIG. 8 shows an arrangement incorporating a three-phase stator winding $11a$ which, if energised through terminals $a$, $b$, and $c$ will create a field of $p_1$ pole-pairs and which, if energised through terminals $a'$, $b'$ and $c'$ with terminals $a$, $b$, and $c$ short circuited, will create a field of $2p_1$ pole-pairs.

In the former case, the currents in the rotor winding $13a$ will create a co-operating field of $p_1$ pole-pairs in rotor 13 and, depending upon the winding connecttions, may create a field of $p_2$ or $2p_2$ pole-pairs in rotor 14, which will induce E.M.F.'s of the same pole pattern in stator 12. In the latter case, the currents induced in the rotor winding $13a$ will create a field of $2p_1$ pole-pairs in rotor 13 and a field of $2p_2$ or $p_2$ pole-pairs in rotor 14 and stator 12.

The connection of stator winding $11a$ to the external circuits is either through terminals $a$, $b$ and $c$ or terminals $a'$, $b'$, and $c'$; for either, there is a corresponding group of active terminals for stator winding $12a$.

In this example of a pole-changing machine, conditions in the rotor windings adjust themselves automatically without any need for switching.

The stator windings can be arranged so that the effective numbers of poles in the machine may be switched from $p_1 \pm p_2$ to $2p_1 \pm 2p_2$, or from $p_1 \pm 2p_2$ to $2p_1 \pm p_2$. This makes it possible to change the cascade frequency, for a given machine speed, at will, and thereby minimise the amount of power which neeeds to flow through the variable frequency generator FC shown in FIGS. 4, 5, 6 and 7.

Referring now to FIG. 9 the generator CG in this arrangement has three separate stator windings $20a$, $20b$ and $20c$ and three separate rotor windings $21a$, $21b$ and $21c$, the three rotor windings being connected in series with the phase sequence between the windings $21b$ and $21c$ reversed i.e. connected positively in the sense previously defined.

The two stator windings $20a$ and $20b$ are connected to the frequency-changer FC which is arranged so as to be capable of transferring electrical power in either direction between the two windings. The remaining stator winding $20c$ is connected to the constant frequency output terminals $T_2$ and, as before, frequency and voltage regulators FR and VR are provided for automatically controlling the output frequency and voltage respectively.

Assuming now that subscripts 1 and 2 denote the stages of the machine which are linked by the frequency-changer and that the subscript 0 denotes the output stage, then Equations 1 and 2 may be applied to give:

$$f_1 + f_0 = n_r(p_1 + p_0)$$

(5)

$$f_2 + f_1 = n_r(p_2 + p_0)$$

and $$-\frac{s_1}{s_0}=\frac{f_0}{f_1}$$
$$-\frac{s_2}{s_0}=\frac{f_0}{f_2} \quad (6)$$

Now the slip-power equation for an ideal three-element machine is $$S_1P_1+S_2P_2+S_0P_0=0 \quad (7)$$

Combining Equations 6 and 7 gives $$\frac{P_1}{f_1}+\frac{P_2}{f_2}=\frac{P_0}{f_0} \quad (8)$$

With the arrangement shown in FIG. 9 the power output of the fixed winding $20a$ is delivered, after a change of frequency from $f_1$ to $f_2$, into the fixed winding $20b$, or vice versa, so that we always have:

$$P_2=-P_1 \quad (9)$$

Substituting Equation 9 into Equation 8 gives:

$$\frac{P_1}{P_0}=\frac{f_1 f_2}{f_0(f_2-f_1)} \quad (10)$$

It will be seen that, for $P_1$ to be positive, it is necessary for $f_1$ to be positive and $f_2$ to be negative. These conditions hold good over a theoretical speed range defined by the ratio $$R=\frac{p_1+p_0}{p_2+p_0} \quad (11)$$

If the pre-unit shaft speed of the cascade generator is defined as:

$$x=\frac{f_1+f_0}{f_0} \quad (12)$$

Equation 10 can be written in the form $$\frac{P_1}{P_0}=\frac{(x-1)(R-x)}{x(R-1)} \quad (13)$$

from which it can be seen that $P_1/P_0$ is zero when $x=1$ and when $x=R$ i.e. when $f_1=0$ and $f_2=0$. In these two conditions, the cascade generator operates as a synchronous machine. Between these two limits, $P_1/P_0$ has a maximum positive value when $x=\sqrt{R}$, given by $$\frac{P_1}{P_0{}_{max.}}=\sqrt{\frac{R-1}{R+1}} \quad (14)$$

Equation 14 shows that with a theoretical speed range of 3:1 the value of $P_1/P_0$ will not exceed about 27%. In practice, the operation of the frequency-changer is facilitated by the avoidance of low frequencies at either end, for which it is necessary to restrict the working speed range to a value less than R. For example, to ensure that neither $f_1/f_0$ nor $f_2/f_0$ shall be less than 20% with $R=3.0$ and $P_1/P_0$ not exceeding 27%, the speed range is restricted to 2:1. It will be evident, however, that any desired value of R may be employed by an appropriate choice of the number of poles for each of the stator windings.

It will be understood that the electric generating apparatus as hereinbefore defined, may comprise separate machines coupled together mechanically. Where the separate stages are incorporated in a single housing with the rotors mounted on a common shaft, either the stator windings or the rotor windings, or both, may be carried by a common stator and rotor core respectively, provided that the windings are wound for different numbers of poles so as to avoid interaction between the windings.

What I claim as my invention and desire to secure by Letters Patent is:

1. Electric generating apparatus including: a stationary magnetic system incorporating a single laminated core carrying at least two polyphase stator windings each wound for a different number of poles and between which there is substantially no mutual inductance; and a rotor comprising a single laminated core incorporating a corresponding number of polyphase distributed rotor windings between which there is substantially no mutual inductance, one rotor winding being associated with each of the stator windings and being wound for the same number of poles as is the associated stator winding, each of the rotor windings being coupled magnetically to the associated stator winding and the rotor windings being connected together electrically in a closed circuit and with phase sequence reversal.

2. Electric generating apparatus including a stationary magnetic system incorporating at least two polyphase distributed stator windings between which there is substantially no mutual inductance; and a rotor system incorporating a corresponding number of polyphased distributed rotor windings between which there is substantially no mutual inductance, each of the rotor windings being coupled magnetically to the associated stator winding and the rotor windings being connected together electrically in a closed circuit and in reverse phase, the stator windings being arranged so that by changing the connections thereto the effective number of stator poles may be changed.

3. A constant frequency, brushless generating system, comprising: a source of variable speed mechanical power; a first electrical machine having a stator and a rotor, said rotor being driven from said source of mechanical power and having an electrical output with at least three phases; a second electrical machine having a stator and a rotor, said second rotor being driven from said source of mechanical power and electrically connected with the output of said first rotor and in reverse phase relation; means for deriving electrical power from the stator of said second machine; and means operable as a function of the speed of said mechanical power source for exciting the stator of said first machine at a frequency related to said speed and variable therewith to keep constant the frequency of electrical power from the stator of said second electrical machine.

4. A constant frequency, brushless generating system, comprising: a source of variable speed mechanical power; a first electrical machine having a stator and a rotor, said rotor being driven from said source of mechanical power and having an electrical output with at least three phases; a second electrical machine having a stator and a rotor, said second rotor being driven from said source of mechanical power and electrically connected with the output of said first rotor and in reverse phase relation; means for deriving electrical power from the stator of said second machine; means for deriving a signal having a frequency proportional to the speed of said mechanical power source; a frequency regulator for establishing a control signal which is a function of the deviation of the frequency of said speed proportional signal from a desired frequency; and a frequency changer responsive to said control signal for exciting the stator of said first electrical machine at a frequency related to the frequency of said speed proportional signal and variable therewith to keep constant the frequency of electrical power from the stator of said second electrical machine.

5. A constant frequency, brushless generating system, comprising: a source of variable speed mechanical power; a first electrical machine having a stator and a rotor, said rotor being driven from said source of mechanical power and having an electrical output with at least three phases; a second electrical machine having a stator and a rotor, said second rotor being driven from said source of mechanical power and electrically connected with the output of said first rotor and in reverse phase relation; means for deriving electrical power from the stator of said second machine; means for deriving a signal having a frequency proportional to the speed of said mechanical power source; a frequency regulator for establishing a control signal which is a function of the deviation of the frequency of said speed proportional signal from a desired frequency; and a reversible frequency changer responsive to said control signal for exciting the stator of said first electric machine at a frequency above or below zero frequency depending upon the deviation of the speed of second power source above and below a speed at which the desired frequency is produced with direct current excitation of the stator of said first electrical machine.

6. A constant frequency, brushless generating system, comprising: a source of variable speed mechanical power; a first electrical machine having a stator and a rotor, said rotor being driven from said source of mechanical power and having an electrical output; a second electrical machine having a stator and a rotor, said second rotor being driven from said source of mechanical power and electrically connected with the output of said first rotor; means for deriving electrical power from the stator of said second machine; a separate generator, for producing an exciting potential for the stator for said first electrical machine; and means operable as a function of the speed of said power source for controlling the exciting potential from said generator to provide an excitation signal for the first electrical machine at a frequency related to the speed of said power source and variable therewith to keep constant the frequency of electrical power from the stator of said second electrical machine.

7. A constant frequency, brushless generationg system, comprising: a source of variable speed mechanical power, and including a variable speed rotating shaft; a first electrical machine having a stator and rotor, said rotor being driven by said shaft and having an electrical output with at least three phases; a second electrical machine having a stator and a rotor, said second rotor being driven by said shaft, and electrically connected with the output of said first rotor and in reverse phase relation; means for deriving electrical power from the stator of said second electrical machine; means for deriving a signal at a frequency proportional to the speed of said shaft; a frequency regulator for establishing a control signal which is a function of the deviation of the frequency of said speed proportional signal from a desired frequency; and a frequency changer responsive to said control signal for exciting the stator of said first electrical machine at a frequency related to the frequency of said speed proportional signal and variable therewith to keep constant the frequency of electrical power from the stator of said second electrical machine.

8. In a brushless generating system including first and second electrical machines each having stators and rotors of at least three phases electrically connected in reverse phase relation driven from a mechanical power source, the method of maintaining the frequency of electrical power from the stator of said second electrical machine constant, comprising: sensing the speed of said power source; and exciting the stator of the first electrical machine at a frequency relating to said speed to keep constant said frequency.

9. In a brushless generating system including a first electrical machine having a stator and rotor with $p_1$ poles, a second electrical machine having a stator and rotor with $p_2$ poles, both rotors being driven by a shaft having the speed $n_r$ and being connected in reverse phase relation, the method of maintaining the frequency of electrical power derived from the stator of said second machine constant at a frequency $f_2$, comprising: sensing the speed $n_r$ of said shaft; and exciting the stator of said first machine at a frequency $f_1$, where:

$$f_1 \pm f_2 = n_r(p_1 \pm p_2)$$

10. A generating system according to claim 3, including voltage responsive means responsive to the output voltage of the machine arranged to vary the voltage of the means for exciting the stator of the first machine to maintain the output voltage substantially constant.

11. A generating system according to claim 3 wherein the means for exciting the stator of the first machine comprises a source of electric power and a frequency changer capable of transferring power between said source and said stator winding.

12. A generating system according to claim 11 wherein said source comprises a generator driven from said source of mechanical power.

13. A constant frequency, brushless generating system, comprising: a source of variable speed mechanical power; electric generating apparatus having three stator windings and three rotor windings, the rotor windings being driven from said source of mechanical power; frequency conversion means interconnecting two of the stator windings and arranged to be capable of transferring electrical power between the two windings, the third stator winding being utilized as the output winding; and frequency responsive means responsive to the output frequency of the third stator winding to vary the frequency of the electrical power delivered by the frequency conversion means to maintain the output frequency of the third stator winding in accordance with a predetermined law.

References Cited by the Examiner

UNITED STATES PATENTS 2,659,044  11/53  MacNeil ---------------- 322—1

RALPH D. BLAKESLEE, Acting Primary Examiner.

MILTON O. HIRSHFIELD, LLOYD McCOLLUM,
Examiners.